E. L. SUESS.
CUSHION TIRE.
APPLICATION FILED APR. 29, 1916. RENEWED JAN. 22, 1917.
1,237,574.
Patented Aug. 21, 1917.
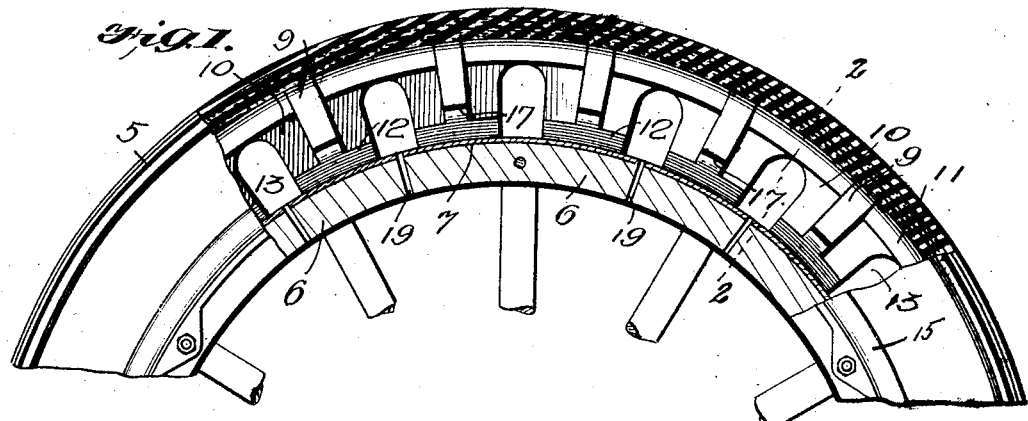
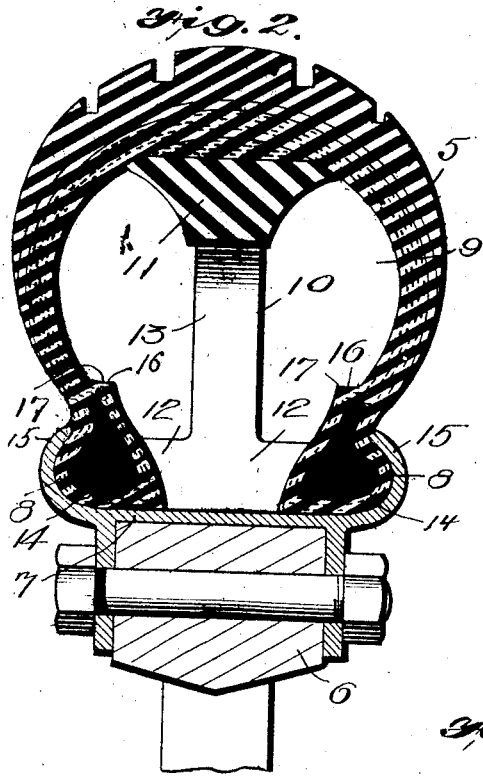
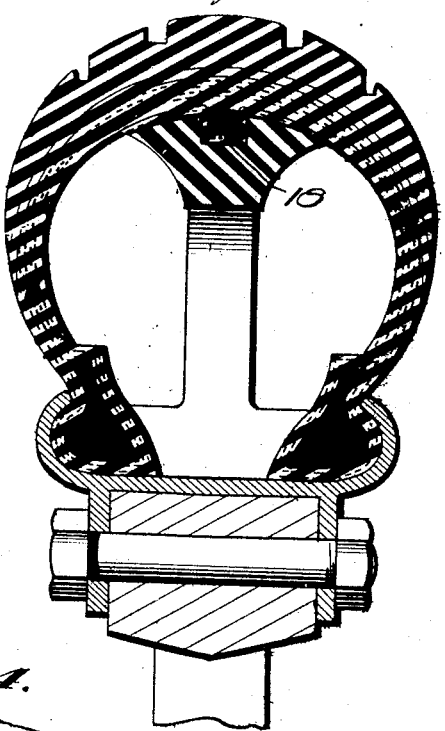
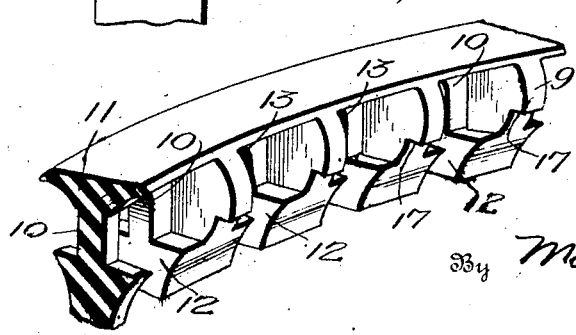
Inventor
Edmund L. Suess
By Max A. Schmidt
Attorney

UNITED STATES PATENT OFFICE.

EDMUND L. SUESS, OF PITTSBURGH, PENNSYLVANIA.

CUSHION-TIRE.

1,237,574. Specification of Letters Patent. Patented Aug. 21, 1917.

Application filed April 29, 1916, Serial No. 94,373. Renewed January 22, 1917. Serial No. 143,841.

*To all whom it may concern:*

Be it known that I, EDMUND L. SUESS, a citizen of the United States, residing at Pittsburgh, in the county of Allegheny and State of Pennsylvania, have invented certain new and useful Improvements in Cushion-Tires, of which the following is a specification.

This invention relates to cushion-tires which obtain resiliency by means other than inflation by air, and more particularly a tire of this kind which is composed of an outer casing and an inclosed resilient core, the latter taking the place of the usual inflatable inner tube of a pneumatic tire.

The invention has for its object to provide a tire of the kind stated which possesses the resiliency and easy riding qualities of a pneumatic tire, the core being constructed so that an ample support for the load placed on the tire is had, together with a wide bearing under the entire running area of the tire, and a firm support against side thrust.

The object stated is attained by means of a novel combination and arrangement of parts to be hereinafter described and claimed, and in order that the same may be better understood, reference is had to the accompanying drawing, forming a part of this specification.

In the drawing—

Figure 1 is a side elevation of a fragment of the tire, partly in section;

Fig. 2 is a cross-section on the line 2—2 of Fig. 1;

Fig. 3 is a cross-section showing a slight modification, and

Fig. 4 is a perspective view of a fragment of the core.

Referring specifically to the drawing, 5 denotes the outer casing of the tire, the same being of the usual clencher type, and secured to the wheel felly 6 by the ordinary clencher rim 7. The clencher beads of the casing are shown at 8.

The core which fills the casing 5 consists of soft rubber blocks 9 connected at the center in a continuous series and in spaced relation by integral webs 10. The blocks 9 form partitions which extend across the inside of the casing, and they are shaped to conform to the cross-sectional contour of the space inside the casing. At the places where the blocks are located they completely fill the space inside the casing, their base portions fitting between the clencher beads 8 of the casing and seating on that portion of the rim 7 not occupied by the latter.

The webs 10 extend from the base to the top of the blocks 9, flush with the top, and adjacent to the latter they are widened as indicated at 11 to obtain a wide surface of contact with the inner surface of the casing 5 directly beneath the tread portion thereof. At the base of the webs are lateral extensions 12 to the side edges of the blocks, these extensions fitting in the space between the clencher beads 8 and conforming to the shape of the corresponding portions of the blocks. The extensions 12 seat on the rim 7 and provide a wide base for the webs, and also increase the thickness of the base portions of the blocks.

The webs 10 hold the blocks 9 in spaced relation and as they do not completely occupy the spaces between the blocks, the core is formed with a series of air spaces. In each web 10 is an opening 13 establishing communication between the air spaces on opposite sides of the web. This opening extends from the base of the web to the enlarged top portion 11 thereof, leaving the latter intact. The openings allow the core to stretch easily over the rim 7 when it is placed inside the casing 5.

The clencher beads 8 are provided with an internal hard rubber reinforcement 14 which extends upward above the clencher flanges 15 of the rim 7 so as to prevent rim cutting. The casing 5 has internal shoulders 16 above the clencher beads, which are engaged by shoulders 17 on the side edges of the blocks 9. The reinforcement 14 is continued beyond the clencher beads far enough to reinforce the shoulders 16 also.

Where the tire casing 5 is flat on the inside beneath the tread portion, the top of the core in contact with this portion of the casing is also made flat, as shown in Fig. 2. Where the casing is curved as shown in Fig. 3, the top of the core is also made curved, and a hard rubber key 18 extending entirely around the casing is built into the same and fits in a groove in the top of the core to prevent any tendency of the core to turn in the casing when subjected to a severe side thrust. The core may also be vulcanized or cemented to the casing 5.

The advantages of a core constructed as hereinbefore described are that it gives a solid base under the entire running surface of the tire casing, and the wear is uniform and not in spots. A firm support against side thrust is provided, and the core can be easily placed inside the tire casing, as the openings in the webs permit the core to be easily stretched. Rim cuts are eliminated by the hard rubber reinforcement of the clencher beads. The tire will safely carry heavy loads and stand high speeds as well as a pneumatic tire. The base portions of the partitions 9 and the webs 10, where they fit between the clencher beads 8, are wedge-shaped in cross-section. It will therefore be evident that when weight is placed on the tire and the core is compressed, the wedge-shaped base portions spread, and press the clencher beads outward against the flanges 15 of the rim 7, so that the tire is firmly clamped to the rim and prevented from "creeping".

In order to provide for the ventilation of the tire, small holes 19 are made in the wheel felly 6 and through the rim 7, in line with the openings 13. These holes keep the tire cool and also prolong the life of the rubber.

The tire can be applied to the wheel in the same manner as any ordinary clencher tire and no specially constructed rim is necessary.

I claim:

1. A cushion-tire comprising an outer casing of the clencher type having internal shoulders above its clencher beads and an inclosed resilient core composed of partitions extending across the inside of the casing, and webs connecting the partitions in a continuous series and in spaced relation, the side edges of the partitions having shoulders which seat on the shoulders of the casing.

2. A cushion tire comprising an outer casing of the clencher type having its clencher beads provided with an internal reinforcement, and provided with internal shoulders above said beads, the reinforcement being continued beyond the clencher beads to reinforce the shoulders, and an inclosed resilient core composed of partitions extending across the inside of the casing, and connecting webs between the partitions joining the same in a continuous series and in spaced relation, the side edges of the partitions having shoulders which seat on the shoulders of the casing.

3. A cushion tire comprising an outer casing of the clencher type having its clencher beads provided with an internal reinforcement, and provided with internal shoulders above said beads, the reinforcement being continued beyond the clencher beads to reinforce the shoulders, and an inclosed resilient core having side shoulders which seat on the shoulders of the casing.

In testimony whereof I affix my signature in the presence of two witnesses.

EDMUND L. SUESS.

Witnesses:
A. L. STEVENSON,
WILLIAM A. GOLDEN.